(No Model.)
C. M. PARKER.
COUPLING FOR VEHICLES.
No. 378,714. Patented Feb. 28, 1888.
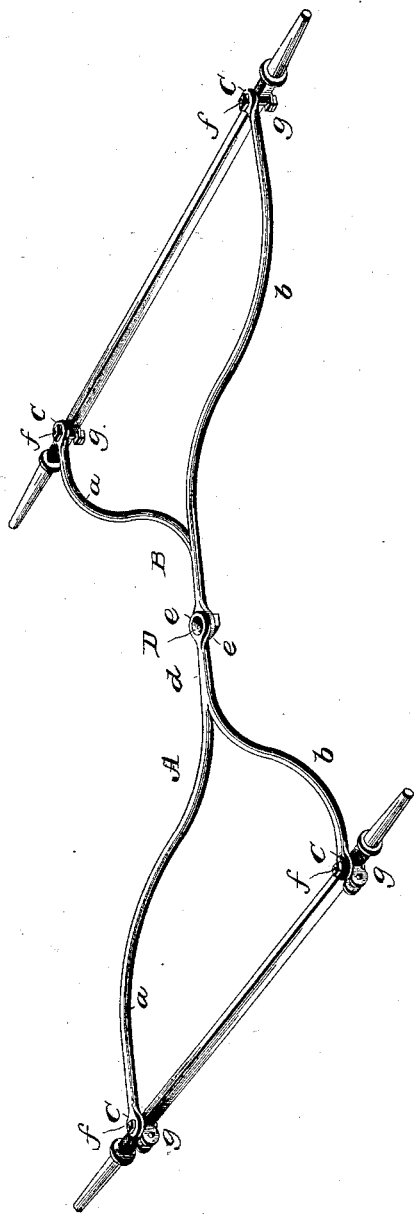
WITNESSES.
L. S. Elliott.
E. M. Johnson.
Charles M. Parker.
INVENTOR,
Attorney.

UNITED STATES PATENT OFFICE.

CHARLES M. PARKER, OF LINCOLN, NEBRASKA.

COUPLING FOR VEHICLES.

SPECIFICATION forming part of Letters Patent No. 378,714, dated February 28, 1888.

Application filed April 30, 1885. Serial No. 164,038. (No model.)

*To all whom it may concern:*

Be it known that I, CHARLES M. PARKER, a citizen of the United States, residing at Lincoln, county of Lancaster, and State of Nebraska, have made certain new and useful Improvements in Coupling Wheeled Vehicles; and I do hereby declare that the following is a full, clear, and exact description of my improvements, reference being had to the accompanying drawings, forming a part of this specification.

My invention relates to running-gear for vehicles, &c.; and it consists in the improvements hereinafter explained and set forth.

In the accompanying drawing, forming part of this specification, the figure represents in perspective my improvements applied to a pair of vehicle axles.

The connection between the front and rear axles is made by means of two members, A B, each of which consists of a single casting comprising two arms, $a\,b$, which are curved and spread, and each terminates in a flattened end portion, C. Each pair of arms $a\,b$ are integrally joined together at their inner ends to represent a neck portion, $d$, which terminates in a flattened plate or seat, $e$. Each of the plates C is perforated for the engagement with a pin, $f$, which is mounted upon the axle by means of a clip, $g$. The plates $e$ are pivotally connected together by a pivot, D, by means of which they are enabled to fully turn in a horizontal direction relative to each other.

From the foregoing it will be apparent that by having the two members of the same size and constructed as described they may readily be cast in duplicate to provide the necessary running-gear for each vehicle, and that they form a simple, inexpensive, and ready connection for the front and rear axles, whereby both may have a pivotal movement to prevent the rigidity of the rear axle in turning curves, &c. What is more, the connection dispenses with a multiplicity of parts.

I am aware that prior to my invention it was not new to connect the front and rear axles of a vehicle to each other, so that they would move simultaneously or in unison, by movable bars which were connected to each other by a slotted connection, and I do not claim such construction as my invention.

I claim—

The herein-described reach-coupling, consisting of two forks or yokes, A B, which are secured at their widened ends to the axles and formed with flattened disks at their inner opposing reduced ends, and provided with apertures which receive a joining pivot-bolt, whereby the forward axle will be allowed to turn from the said central point of pivotal union, substantially as described.

CHARLES M. PARKER.

Witnesses:
L. H. LAMB,
W. A. PRESTON.